United States Patent
Zheng et al.

(10) Patent No.: US 9,615,372 B2
(45) Date of Patent: Apr. 4, 2017

(54) METHOD AND APPARATUS FOR PROCESSING RECEIVE/TRANSMIT TRANSITION TIME OF USER EQUIPMENT

(71) Applicant: HUAWEI TECHNOLOGIES CO., LTD., Shenzhen (CN)

(72) Inventors: Juan Zheng, Beijing (CN); Lixia Xue, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 188 days.

(21) Appl. No.: 14/289,958

(22) Filed: May 29, 2014

(65) Prior Publication Data

US 2014/0307662 A1    Oct. 16, 2014

Related U.S. Application Data

(63) Continuation of application No. PCT/CN2012/085220, filed on Nov. 24, 2012.

(30) Foreign Application Priority Data

Dec. 2, 2011    (CN) .......................... 2011 1 0396227

(51) Int. Cl.
*H04W 4/00* (2009.01)
*H04W 72/08* (2009.01)
*H04W 24/10* (2009.01)

(52) U.S. Cl.
CPC ......... *H04W 72/082* (2013.01); *H04W 24/10* (2013.01)

(58) Field of Classification Search
CPC .................................................... H04W 28/04
(Continued)

(56) References Cited

U.S. PATENT DOCUMENTS

2004/0151143 A1 * 8/2004 Abdesselem ..... H04W 56/0045
370/336
2006/0223557 A1   10/2006 Manohar
(Continued)

FOREIGN PATENT DOCUMENTS

CN    101047883    10/2007
CN    101185364    5/2008
(Continued)

OTHER PUBLICATIONS

PCT International Search Report and Written Opinion of the International Searching Authority dated Feb. 28, 2013 in corresponding International Patent Application No. PCT/CN2012/085220.
(Continued)

*Primary Examiner* — Samina Choudhry
(74) *Attorney, Agent, or Firm* — Staas & Halsey LLP

(57) ABSTRACT

In the present application, when the problem of co-channel interference between base stations is eliminated, normal neighboring cell measurement can still be performed on a second base station by delaying receive/transmit transition time of the user equipment. The method includes: receiving, by the user equipment, first indication information sent by a first base station; determining, by the user equipment according to the first indication information, receive/transmit transition time needing to be delayed; determining, by the user equipment according to the receive/transmit transition time needing to be delayed, a downlink time of performing neighboring cell measurement for a second base station, and performing, by the user equipment, neighboring cell measurement for the second base station at the downlink time. The present application is applicable to the field of wireless communications systems.

12 Claims, 5 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2007/0117566 | A1 | 5/2007 | Khawand et al. |
| 2010/0118706 | A1* | 5/2010 | Parkvall ................ H04L 5/0023 370/241 |
| 2010/0208603 | A1* | 8/2010 | Ishii ..................... H04B 1/7113 370/252 |

FOREIGN PATENT DOCUMENTS

| | | |
|---|---|---|
| CN | 101998437 | 3/2011 |
| EP | 2161957 A1 | 3/2010 |
| WO | 2008/127185 A1 | 10/2008 |
| WO | 2011/122833 A2 | 10/2011 |
| WO | 2012/061224 A1 | 5/2012 |
| WO | 2013/049057 A1 | 4/2013 |

OTHER PUBLICATIONS

"Further Enhanced Non-CA Based ICIC for LTE", 3GPP Work Area: Radio Access, Work Task, 6pp.
"Further Enhanced Non CA-based ICIC for LTE", 3GPP Work Area: Radio Access, Building Block, 5pp.
"Further Enhanced Non CA-based ICIC for LTE performance part", 3GPP Work Area: Radio Access, Work Task, 5pp.
Chinese Notice of Allowance dated Sep. 28, 2015 in corresponding Chinese Patent Application No. 201110396227.9.
International Search Report mailed Feb. 28, 2013 in corresponding International Patent Application No. PCT/CN2012/085220.
Chinese Office Action dated Jan. 22, 2015 in corresponding Chinese Patent Application No. 201110396227.9.
Extended European Search Report dated May 4, 2015 in corresponding European Patent Application No. 12852885.8.

* cited by examiner

METHOD AND APPARATUS FOR PROCESSING RECEIVE/TRANSMIT TRANSITION TIME OF USER EQUIPMENT

CROSS-REFERENCE TO RELATED APPLICATION

This application is a continuation of International Application No. PCT/CN2012/085220, filed on Nov. 24, 2012, which claims priority to Chinese Patent Application No. 201110396227.9, filed on Dec. 2, 2011, both of which are hereby incorporated by reference in their entireties.

TECHNICAL FIELD

The present application relates to the field of a wireless communications system, and in particular, to a method and an apparatus for processing receive/transmit transition time of a user equipment.

BACKGROUND

In a wireless communications system, in order to improve the spectrum utilization rate of a system, a low-power base station and a macro base station perform complete or partial spectrum multiplexing, so that co-channel (or co-frequency) interference may occur between the low-power base station and the macro base station.

In order to protect transmission on a downlink channel of an interfered base station (a second base station, such as a macro base station, a pico base station, a relay base station, and a home base station), especially transmission on a downlink control channel of the second base station, in a time division duplex (TDD) system, different TDD proportions may be configured for an interfering base station (a first base station, such as a macro base station, a pico base station, a relay base station, and a home base station) and the interfered base station (the second base station), so that the number of uplink subframes of the first base station is greater than the number of uplink subframes of the second base station. Meanwhile, the first base station may configure some uplink subframes corresponding to downlink subframes of the second base station as fake uplink subframes (Fake Uplink Subframe), so as to reduce the interference to the transmission on the downlink channel of the second base station. A fake uplink subframe refers to that, although the subframe is an uplink subframe, the uplink subframe is enabled to carry as few of service data services and control data services as possible by using a scheduling or configuration method, so as to reduce interference to the transmission on the downlink channel of the second base station. At the same time, time shift technologies can also eliminate the problem of co-channel interference between cells.

However, for a UE served by the first base station, when neighboring cell measurement of the second base station is performed, because the UE is in uplink sending state under the TDD proportion of the first base station, the UE cannot receive and detect a signal carried in a downlink SCH (synchronization channel) and sent by the second base station, and further cannot acquire a location of a CRS (cell-specific reference signal), thereby influencing normal neighboring cell measurement performed by the UE.

SUMMARY

Embodiments of the present application provide a method and an apparatus for processing receive/transmit transition time of a user equipment, solving the problem that a UE cannot perform normal neighboring cell measurement when co-channel interference between base stations is being eliminated.

The embodiments of the present application adopt the following technical solutions.

A method for processing receive/transmit transition time of a user equipment includes:

receiving, by a user equipment, first indication information sent by a first base station;

determining, by the user equipment according to the first indication information, receive/transmit transition time needing to be delayed;

determining, by the user equipment according to the receive/transmit transition time needing to be delayed, a downlink time of performing neighboring cell measurement for a second base station; and performing, by the user equipment, neighboring cell measurement for the second base station at the downlink time.

A user equipment includes:

a receiving unit, configured to receive first indication information sent by a first base station;

a determining unit, configured to determine, according to the first indication information received by the receiving unit, receive/transmit transition time needing to be delayed, and determine, according to the receive/transmit transition time needing to be delayed, a downlink time of performing neighboring cell measurement for a second base station; and a measurement unit, configured to perform neighboring cell measurement for the second base station at the downlink time determined by the determining unit.

A method for processing receive/transmit transition time of a user equipment includes:

determining, by a first base station, first indication information needing to be sent to a user equipment; and sending, by the first base station, the first indication information to the user equipment, so that the user equipment determines, according to the first indication information, receive/transmit transition time needing to be delayed, further determines, according to the receive/transmit transition time needing to be delayed, a downlink time of performing neighboring cell measurement for a second base station, and performs neighboring cell measurement for the second base station at the downlink time.

A base station includes:

a determining unit, configured to determine first indication information needing to be sent to a user equipment; and a sending unit, configured to send the first indication information determined by the determining unit to the user equipment, so that the user equipment determines, according to the first indication information, receive/transmit transition time needing to be delayed, further determines, according to the receive/transmit transition time needing to be delayed, a downlink time of performing neighboring cell measurement for a second base station, and performs neighboring cell measurement for the second base station at the downlink time.

In the method and apparatus for processing receive/transmit transition time of a user equipment according to the embodiments of the present application, firstly, the first base station sends the first indication information to the user equipment, then the user equipment determines, according to the first indication information, the receive/transmit transition time needing to be delayed, and finally, the user equipment determines, according to the receive/transmit transition time needing to be delayed, the downlink time of performing neighboring cell measurement for the second base station, and the user equipment performs neighboring cell measurement for the second base station at the downlink time. In the prior art, although the problem of co-channel interference between base stations may be eliminated, the user equipment served by the first base station cannot perform neighboring cell measurement for the second base station. However, in the embodiments of the present application, when the problem of co-channel interference between base stations is eliminated, the user equipment served by the first base station can perform normal neighboring cell measurement for the second base station by delaying the receive/transmit transition time of the user equipment. In this case, neighboring cell measurement can be performed when the channel quality is ensured.

BRIEF DESCRIPTION OF DRAWINGS

To make the technical solutions of the present application clearer, the accompanying drawings for illustrating the embodiments of the present application or the prior art are given briefly below. Apparently, the accompanying drawings are only for the exemplary purpose, and persons of ordinary skill in the art can derive other drawings from the accompanying drawings without creative efforts.

DESCRIPTION OF EMBODIMENTS

The technical solutions of the present application are clearly described in the following with reference to the accompanying drawings. It is obvious that the embodiments to be described are only a part rather than all of the embodiments of the present application. All other embodiments obtained by persons of ordinary skill in the art based on the embodiments of the present application without creative efforts shall fall within the protection scope of the present application.

In order to make the advantages of the technical solutions of the present application more comprehensible, the present application is described in further detail below with reference to the accompanying drawings and embodiments.

Embodiment 1

Figure 1:
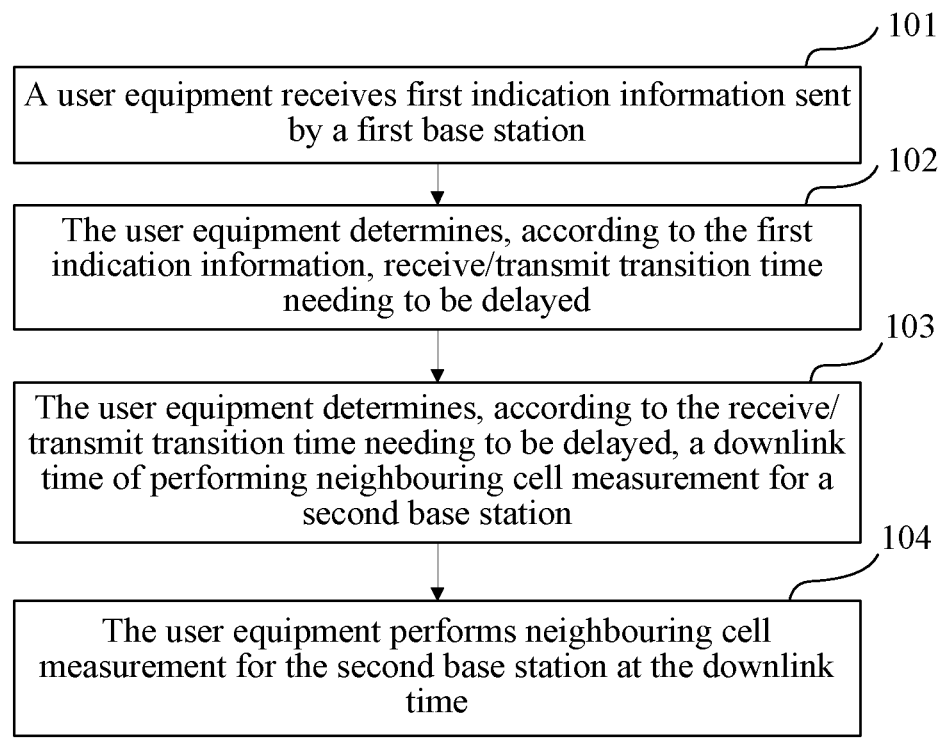
FIG. 1 is a flow chart of a method for processing receive/transmit transition time of a user equipment according to Embodiment 1 of the present application.

This embodiment provides a method for processing receive/transmit transition time of a user equipment. As shown in FIG. 1, the method includes:

101: A user equipment receives first indication information sent by a first base station.

The first base station may be a serving base station of the user equipment, or may be a communications entity in interface connection with the serving base station of the user equipment and having a function of sending information. The interface connection may be an X2 interface, an S1 interface, a fiber interface and a wireless interface, which is not limited herein. The communications entity may be a remote radio unit (RRU) in interface connection with the serving base station of the user equipment, or may be a mobile management entity (MME) in interface connection with the serving base station of the user equipment, or may be a non-serving base station in interface connection with the serving base station of the user equipment, which is not limited herein.

Specifically, the user equipment may receive the first indication information which is sent by the first base station through first signaling. When the first indication information includes information indicating whether the user equipment needs to delay receive/transmit transition time, and information of specific delayed time for receive/transmit transition, the first signaling, which is radio resource control RRC broadcast signaling, or RRC-specific signaling, or physical layer signaling, may be used to indicate the information indicating whether the user equipment needs to delay the receive/transmit transition time, and the information of specific delayed time for receive/transmit transition. Or, the first signaling, which is the radio resource control RRC broadcast signaling, or the RRC-specific signaling, or the physical layer signaling, may be used to indicate the information indicating whether the user equipment needs to delay the receive/transmit transition time, and first signaling which is different from the foregoing signaling is used to indicate the information of specific delayed time for receive/transmit transition of the user equipment. When the first indication information includes the information indicating whether the user equipment needs to delay the receive/transmit transition time, or the information of specific delayed time for receive/transmit transition, the first indication information may be directly sent to the user equipment by using the first signaling, which is the radio resource control RRC broadcast signaling, or the RRC-specific signaling, or the physical layer signaling.

In addition, specifically, the user equipment may receive the first indication information which is sent by the first base station through the first signaling. When the first indication information includes configuration information of an interference coordination mechanism adopted by the first base station and configuration information of the first base station, the first signaling, which is the radio resource control RRC broadcast signaling, or the RRC-specific signaling, or the physical layer signaling, may be used to indicate the configuration information of the interference coordination mechanism adopted by the first base station and the configuration information of the first base station. Or, the first signaling, which is the radio resource control RRC broadcast signaling, or the RRC-specific signaling, or the physical layer signaling, may be used to indicate for the user equipment the configuration information of the interference coordination mechanism adopted by the first base station, and first signaling which is different from the foregoing signaling may be used to indicate the configuration information of the first base station.

102: The user equipment determines, according to the first indication information, receive/transmit transition time needing to be delayed.

103: The user equipment determines, according to the receive/transmit transition time needing to be delayed, a downlink time of performing neighboring cell measurement for a second base station.

The second base station refers to a neighboring base station corresponding to the serving base station of the user equipment, and it may be a neighboring base station interfered by the first base station or may be a base station having a time offset in sending time with the first base station, where the time offset may be an integer number of OFDM (orthogonal frequency division multiplexing) symbols, an integer number of time slots, an integer number of subframes, or an integer number of radio frames, which is not limited herein.

The downlink time may be a time at which the second base station sends downlink data, or a time at which the user equipment receives downlink data. The downlink time may be represented by using an integer number of OFDM symbols, an integer number of time slots, an integer number of subframes, or an integer number of radio frames, which is not limited herein.

104: The user equipment performs neighboring cell measurement for the second base station at the downlink time.

The neighboring cell measurement includes, but is not limited to, measurement related to channel quality indicator CQI, precoding matrix indicator PMI, rank indicator RI, RRM (radio resource management), and the like.

Figure 2:
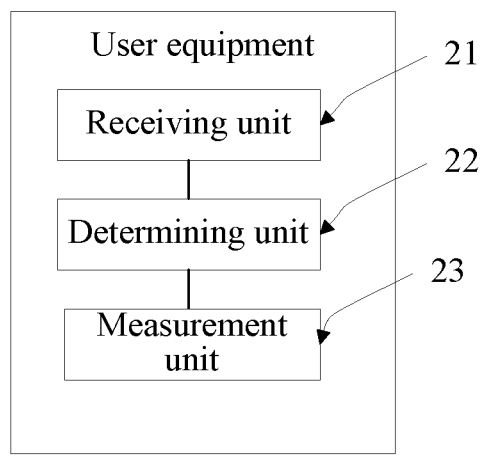
FIG. 2 is a schematic structural diagram of a user equipment according to Embodiment 1 of the present application.

This embodiment provides a user equipment. As shown in FIG. 2, the apparatus includes a receiving unit 21, a determining unit 22 and a measurement unit 23.

The receiving unit 21 is configured to receive the first indication information sent by the first base station.

The first base station may be a serving base station of the user equipment, or may be a communications entity in interface connection with the serving base station of the user equipment and having a function of sending information. The interface connection may be an X2 interface, an S1 interface, a fiber interface and a wireless interface, which is not limited herein. The communications entity may be a remote radio unit (RRU) in interface connection with the serving base station of the user equipment, or may be a mobile management entity (MME) in interface connection with the serving base station of the user equipment, or may be a non-serving base station in interface connection with the serving base station of the user equipment, which is not limited herein.

Specifically, the user equipment may receive the first indication information which is sent by the first base station through first signaling. When the first indication information includes information indicating whether the user equipment needs to delay receive/transmit transition time, and information of specific delayed time for receive/transmit transition, the first signaling, which is radio resource control RRC broadcast signaling, or RRC-specific signaling, or physical layer signaling, may be used to indicate the information indicating whether the user equipment needs to delay the receive/transmit transition time, and the information of specific delayed time for receive/transmit transition. Or, the first signaling, which is the radio resource control RRC broadcast signaling, or the RRC-specific signaling, or the physical layer signaling, may be used to indicate the information indicating whether the user equipment needs to delay the receive/transmit transition time, and first signaling which is different from the foregoing signaling is used to indicate the information of specific delayed time for receive/transmit transition of the user equipment. When the first indication information includes the information indicating whether the user equipment needs to delay the receive/transmit transition time, or the information of specific delayed time for receive/transmit transition, the first indication information may be directly sent to the user equipment by using the first signaling, which is the radio resource control RRC broadcast signaling, or the RRC-specific signaling, or the physical layer signaling.

In addition, specifically, the user equipment may receive the first indication information which is sent by the first base station through the first signaling. When the first indication information includes configuration information of an interference coordination mechanism adopted by the first base station and configuration information of the first base station, the first signaling, which is the radio resource control RRC broadcast signaling, or the RRC-specific signaling, or the physical layer signaling, may be used to indicate the configuration information of the interference coordination mechanism adopted by the first base station and the configuration information of the first base station. Or, the first signaling, which is the radio resource control RRC broadcast signaling, or the RRC-specific signaling, or the physical layer signaling, may be used to indicate for the user equipment the configuration information of the interference coordination mechanism adopted by the first base station, and first signaling which is different from the foregoing signaling may be used to indicate the configuration information of the first base station.

The determining unit 22 is configured to determine, according to the first indication information received by the receiving unit 21, receive/transmit transition time needing to be delayed, and determine, according to the receive/transmit transition time needing to be delayed, a downlink time of performing neighboring cell measurement for a second base station.

The second base station refers to a neighboring base station corresponding to the serving base station of the user equipment, and it may be a neighboring base station interfered by the first base station or may be a base station having a time offset in sending time with the first base station, where the time offset may be an integer number of OFDM (orthogonal frequency division multiplexing) symbols, an integer number of time slots, an integer number of subframes, or an integer number of radio frames, which is not limited herein.

The downlink time may be a time at which the second base station sends downlink data, or a time at which the receiving unit 21 receives downlink data. The downlink time may be represented by using an integer number of OFDM symbols, an integer number of time slots, an integer number of subframes, or an integer number of radio frames, which is not limited herein.

The measurement unit 23 is configured to perform neighboring cell measurement for the second base station at the downlink time determined by the determining unit 22.

The neighboring cell measurement includes, but is not limited to, measurement related to channel quality indicator CQI, precoding matrix indicator PMI, rank indicator RI, RRM (radio resource management), and the like.

Figure 3:
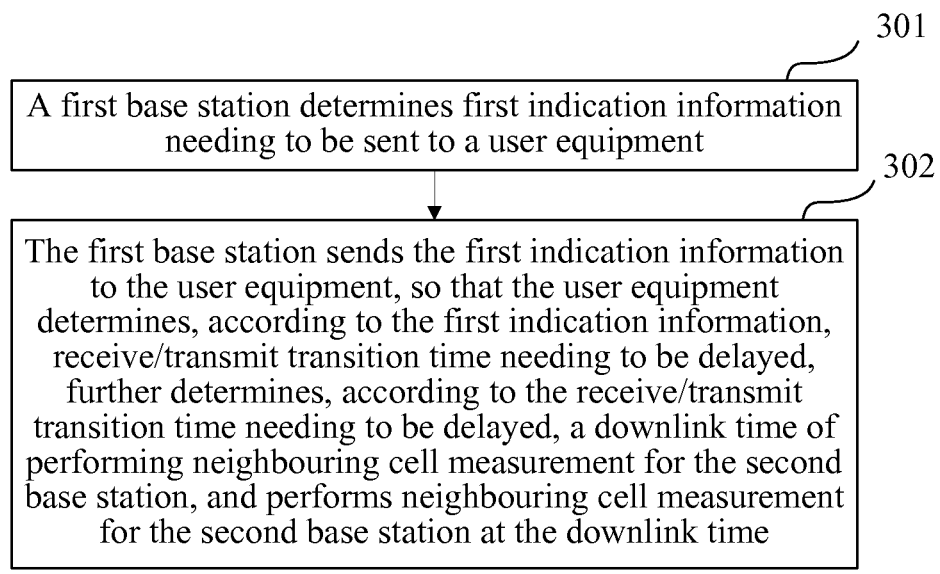
FIG. 3 is a flow chart of a method for processing receive/transmit transition time of a user equipment according to Embodiment 1 of the present application.

This embodiment provides a method for processing receive/transmit transition time of a user equipment. As shown in FIG. 3, the method includes:

301: A first base station determines first indication information needing to be sent to a user equipment.

The first base station may determine, according to a time offset between the first base station and a second base station, whether to send the first indication information to the user equipment, or the first base station may determine, according to whether an interference mechanism is adopted to reduce the interference to the second base station, whether to send the first indication information to the user equipment, or the first base station may determine, according to other manners, whether to send the first indication information to the user equipment, which is not limited herein. The interference mechanism may be that the first base station adopts fake uplink subframe (fake UL subframe) configuration, or that the first base station adopts low-power sending subframe configuration or almost blank sending subframe configuration, or that the first base station jointly adopts the fake UL subframe configuration and a time shift technology, or that the first base station jointly adopts the low-power sending subframe configuration and the time shift technology, or the almost blank sending subframe configuration and the time shift technology, which is not limited herein.

302: The first base station sends the first indication information to the user equipment, so that the user equipment determines, according to the first indication information, receive/transmit transition time needing to be delayed, further determines, according to the receive/transmit transition time needing to be delayed, a downlink time of performing neighboring cell measurement for the second base station, and performs neighboring cell measurement for the second base station at the downlink time.

Specifically, the first base station may send the first indication information to the user equipment through first signaling. The first signaling may include: radio resource control RRC broadcast signaling, or RRC-specific signaling, or physical layer signaling. The first indication information includes: information indicating whether the user equipment needs to delay the receive/transmit transition time, and/or information of specific delayed time for receive/transmit transition, or the first indication information includes: configuration information of an interference coordination mechanism adopted by the first base station and configuration information of the first base station, so that the user equipment determines, according to the configuration information of the interference coordination mechanism adopted by the first base station and the configuration information of the first base station, whether an uplink service exists at a first uplink time. Further, the configuration information of the interference coordination mechanism adopted by the first base station may be configuration information of a fake uplink subframe (fake UL subframe) adopted by the first base station, configuration information of a low-power sending subframe or an almost blank sending subframe adopted by the first base station, configuration information of the fake UL subframe and a time shift technology jointly adopted by the first base station, or configuration information of the low-power sending subframe and the time shift technology jointly adopted by the first base station or configuration information of the almost blank sending subframe and the time shift technology jointly adopted by the first base station, which is not limited herein. The configuration information of the first base station may be a specific location of the fake uplink subframe (fake UL subframe), a specific location of the low-power sending subframe or the almost blank sending subframe, a relative time offset between the first base station and the second base station, or any combination of the foregoing information, which is not limited herein.

The indication methods of the first indication information and the first signaling are the same as the content shown in FIG. 1, which are not described herein again.

Figure 4:
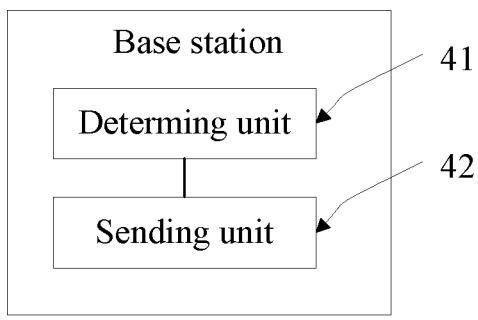
FIG. 4 is a schematic structural diagram of a base station according to Embodiment 1 of the present application.

A base station is provided. As shown in FIG. 4, the apparatus includes: a determining unit 41 and a sending unit 42.

The determining unit 41 is configured to determine first indication information needing to be sent to a user equipment.

The determining unit 41 may determine, according to a time offset between a first base station and a second base station, whether to send the first indication information to the user equipment, or the determining unit 41 may determine, according to whether an interference mechanism is adopted to reduce interference to the second base station, whether to send the first indication information to the user equipment, or the determining unit 41 may determine, according to other manners, whether to send the first indication information to the user equipment, which is not limited herein. The interference mechanism may be that the first base station adopts fake uplink subframe (fake UL subframe) configuration, or that the first base station adopts low-power sending subframe configuration or almost blank sending subframe configuration, or that the first base station jointly adopts the fake UL subframe configuration and a time shift technology, or that the first base station jointly adopts the low-power sending subframe configuration and the time shift technology, or the almost blank sending subframe configuration and the time shift technology, which is not limited herein.

The sending unit 42 is configured to send the first indication information determined by the determining unit 41 to the user equipment, so that the user equipment determines, according to the first indication information, receive/transmit transition time needing to be delayed, further determines, according to the receive/transmit transition time needing to be delayed, a downlink time of performing neighboring cell measurement for the second base station, and performs neighboring cell measurement for the second base station at the downlink time.

Specifically, the first base station may send the first indication information to the user equipment through first signaling. The first signaling includes: radio resource control RRC broadcast signaling, or RRC-specific signaling, or physical layer signaling. The first indication information includes: information indicating whether the user equipment needs to delay the receive/transmit transition time, and/or information of specific delayed time for receive/transmit transition, or the first indication information includes: configuration information of an interference coordination mechanism adopted by the first base station and configuration information of the first base station, so that the user equipment determines, according to the configuration information of the interference coordination mechanism adopted by the first base station and the configuration information of the first base station, whether an uplink service exists at a first uplink time.

The indication methods of the first indication information and the first signaling are the same as the content shown in FIG. 1, which are not described herein again.

In the method and apparatus for processing receive/transmit transition time of a user equipment according to the embodiments of the present application, firstly, the first base station sends the first indication information to the user equipment, then the user equipment determines, according to the first indication information, the receive/transmit transition time needing to be delayed, and finally, the user equipment determines, according to the receive/transmit transition time needing to be delayed, the downlink time of performing neighboring cell measurement for the second base station, and the user equipment performs neighboring cell measurement for the second base station at the downlink time. In the prior art, although the problem of co-channel interference between base stations may be eliminated, the user equipment served by the first base station still cannot perform neighboring cell measurement for the second base station. However, in the embodiments of the present application, when the problem of co-channel interference between base stations is eliminated, normal neighboring cell measurement can still be performed for the second base station by delaying the receive/transmit transition time of the user equipment. In this case, neighboring cell measurement can be performed when the channel quality is ensured.

Embodiment 2

Figure 5:
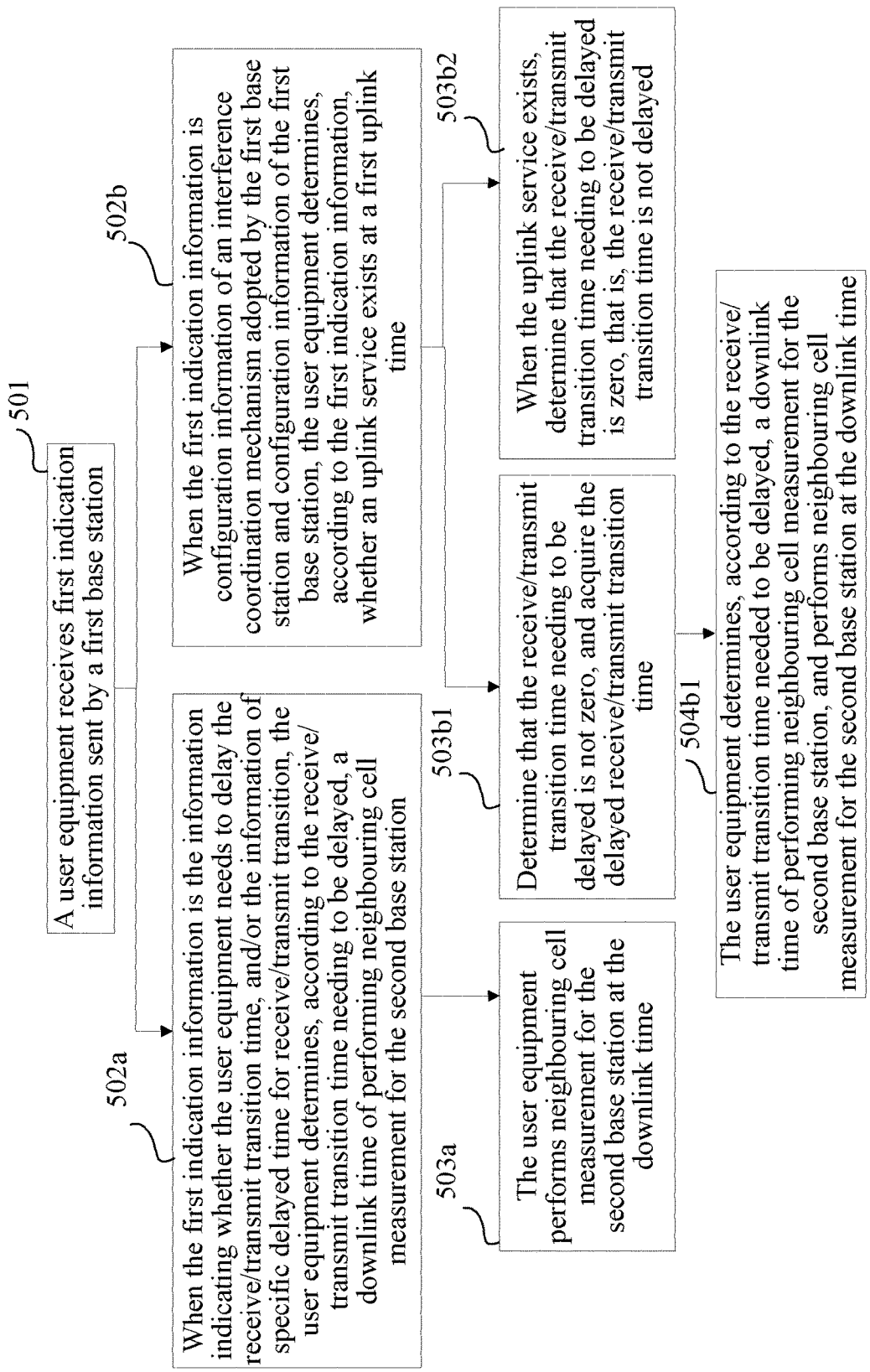
FIG. 5 is a flow chart of a method for processing receive/transmit transition time of a user equipment according to Embodiment 2 of the present application.

This embodiment provides a method for processing receive/transmit transition time of a user equipment. As shown in FIG. 5, the method includes:

501: A user equipment receives first indication information sent by a first base station.

The first base station may be a serving base station of the user equipment, or may be a communications entity in interface connection with the serving base station of the user equipment and having a function of sending information. The interface connection may be an X2 interface, an S1 interface, a fiber interface and a wireless interface, which is not limited herein. The communications entity may be a remote radio unit (RRU) in interface connection with the serving base station of the user equipment, or may be a mobile management entity (MME) in interface connection with the serving base station of the user equipment, or may be a non-serving base station in interface connection with the serving base station of the user equipment, which is not limited herein.

Specifically, the user equipment may receive the first indication information which is sent by the first base station through first signaling. When the first indication information includes information indicating whether the user equipment needs to delay receive/transmit transition time, and information of specific delayed time for receive/transmit transition, the first signaling, which is radio resource control RRC broadcast signaling, or RRC-specific signaling, or physical layer signaling, may be used to indicate the information indicating whether the user equipment needs to delay the receive/transmit transition time, and the information of specific delayed time for receive/transmit transition. Or, the first signaling, which is the radio resource control RRC broadcast signaling, or the RRC-specific signaling, or the physical layer signaling, may be used to indicate the information indicating whether the user equipment needs to delay the receive/transmit transition time, and first signaling which is different from the foregoing signaling is used to indicate for the user equipment the information of specific delayed time for receive/transmit transition. When the first indication information includes the information indicating whether the user equipment needs to delay the receive/transmit transition time, or the information of specific delayed time for receive/transmit transition, the first indication information may be directly sent to the user equipment by using the first signaling, which is the radio resource control RRC broadcast signaling, or the RRC-specific signaling, or the physical layer signaling.

For example, the first base station may instruct, by using RRC broadcast signaling, a user equipment served by a current cell to delay the receive/transmit transition time, where the content carried in the signaling includes, but is not limited to, content indicating whether the user equipment UE needs to delay the receive/transmit transition time and content indicating receive/transmit transition time specifically needing to be delayed by the UE. The signaling may be carried in existing RRC broadcast signaling, for example, may be carried in a physical broadcast channel PBCH ( ), and use redundancy bit information in the PBCH to indicate whether the UE served by the current cell needs to delay the receive/transmit transition time. Further, information of 1 bit may be used to directly indicate whether the UE needs to delay the receive/transmit transition time. In this case, the delayed time required by the UE may be defaulted between the first base station and the UE, for example, time of 1 subframe may be delayed based on the existing delayed time for receive/transmit transition of the UE; or redundancy bit information may be used to directly indicate the delayed time required by the UE for receive/transmit transition, for example, the number of redundancy bits on the PBCH is X, $2^X$ states may be represented. The delayed time for receive/transmit transition may be counted with an orthogonal frequency division multiplexing (OFDM) symbol/subframe/frame as a unit. For example, in the previous example, if the UE is instructed to delay time of 1 subframe, specifically the signaling may be represented as 1sf (1 subframe) or 0.1rf (0.1 radio frame) or 14symbol (14 symbols) or 10slot (10 time slots) by using one of the $2^X$ states, or may be represented by using another manner, which is not limited herein. On the other hand, the signaling may also be carried in a system information block SIB, which specifically may be SIB-1/SIB-2/SIB-3 or the like. The carried information may be what described above, or may be a field directly extended in SIB information. The extended field is used to instruct UE to delay the receive/transmit transition time, and the delayed receive/transmit transition time may ensure that the UE is capable of correctly interpreting information carried in an SCH (synchronization channel) of a neighboring cell, so as to obtain a location of a CRS (cell-specific reference signal), thereby performing neighboring cell measurement.

On the other hand, the first base station may also instruct, by using RRC-specific signaling, a user equipment served by the current cell to delay the receive/transmit transition time. Content carried in the RRC-specific signaling includes, but is not limited to, content indicating whether the UE needs to delay the transition time, and content indicating the specific receive/transmit transition time needing to be delayed by the UE. The RRC-specific signaling may be valid for a group of users having the same feature. For example, the RRC-specific signaling may be valid for a user needing to perform neighboring cell measurement. That is to say, when reading the RRC-specific signaling, the user needing to perform neighboring cell measurement may delay, according to the content of the signaling, the receive/transmit transition time notified by the signaling, so as to ensure that neighboring cell measurement can be performed normally.

On the other hand, the first base station may also instruct, by using physical layer signaling, a user equipment served by the current cell to delay the receive/transmit transition time. Likewise, the content carried in the signaling includes, but is not limited to, content indicating whether the UE needs to delay the receive/transmit transition time, and content indicating the receive/transmit transition time specifically needing to be delayed by the UE. For example, a redundancy bit carried in a physical downlink control channel PDCCH may be used to indicate the foregoing content. Information of the redundancy bit may be obtained by a PDCCH which carries paging channel (Paging) scheduling information or carries system information block type 1 (SIB1) scheduling information or carries physical random access channel (PRACH) scheduling information. Further, for a TDD (Time Division Duplex) system, a paging channel is always in No. 0 subframe; therefore, the UE can always detects, in the No. 0 subframe, a reserved field (that is, the redundancy bit) on the PDCCH scheduling the paging channel, so as to acquire whether the receive/transmit transition time needs to be delayed in a subsequent period of time after the No. 0 subframe, and acquire the specific delayed time if it needs to be delayed. On the other hand, because information of SIB1 is transmitted every 20 ms, that is, the information of SIB1 is transmitted in subframe 5 of each even-numbered radio frame, the UE may learn, by detecting a reserved field (that is, the redundancy bit) on the PDCCH carrying SIB1 scheduling information, whether the receive/transmit transition time needs to be delayed in a subsequent period of time after the subframe 5, and acquire the specific delayed time if it needs to be delayed. For the PRACH, a similar process exists.

In addition, no matter whether the base station uses the RRC broadcast signaling or the RRC-specific signaling or the physical layer signaling to notify the UE of content indicating that the user equipment UE delays the receive/transmit transition time, once the UE delays the receive/transmit transition time, the base station may instruct, by using other signaling, the UE to stop delaying the receive/transmit transition time, and the signaling may be carried in the foregoing signaling, that is, included in the content "indicating whether the UE needs to delay the receive/transmit transition time", and the base station may perform indication by using new RRC broadcast signaling or RRC-specific signaling or physical layer signaling.

In addition, specifically, the user equipment may receive the first indication information which is sent by the first base station through first signaling. When the first indication information includes configuration information of an interference coordination mechanism adopted by the first base station and configuration information of the first base station, the first signaling, which is the radio resource control RRC broadcast signaling, or the RRC-specific signaling, or the physical layer signaling, may be used to indicate the configuration information of the interference coordination mechanism adopted by the first base station and the configuration information of the first base station. Or, the first signaling, which is the radio resource control RRC broadcast signaling, or the RRC-specific signaling, or the physical layer signaling, may be used to indicate for the user equipment the configuration information of the interference coordination mechanism adopted by the first base station, and first signaling which is different from the foregoing signaling may be used to indicate the configuration information of the first base station. Further, a specific designing manner of the signaling may be the same as what described above, which is not described herein again.

Further, the first base station (macro base station Macro) adopts a proportion 0, the second base station (pico base station Pico) adopts a proportion 1, and the first base station and the second base station avoid, by using a fake UL subframe solution and subframe shift, interference from the first base station to a common channel of the second base station such as a synchronization channel SCH/a physical broadcast channel PBCH, and interference from the first base station to a physical downlink control channel PDCCH and/or a physical downlink shared channel PDSCH tranmistted in a subframe 1 and a subframe 6 of the second base station. Further, in order to avoid the interference from the first base station to the Paging channel and SIB-1 channel for transmission of the second base station, the first base station may further configure a downlink part of the subframe 1 and the subframe 6 (such as a downlink pilot time slot DwPTS or a downlink subframe, in this example, because the Macro adopts the TDD proportion 0, the downlink part of the subframes 1 and 6 is the DwPTS) as an almost blank subframe (ABS), so as to further reduce the interference to the Paging channel and SIB-1 channel of an interfered cell. The almost blank subframe refers to that only transmission of common pilot is present in this subframe, or that only transmission of common pilot and transmission of limited control channel (such as physical downlink control channel PDCCH: physical downlink control channel) are present in this subframe. The limited control channel in the almost blank subframe may be used to schedule the paging information and/or system information, or may be used to schedule other broadcast information or unicast information. As described above, in consideration of ensuring backward compatibility of the user equipment UE served by the first base station, limited uplink signals, such as UL ACK or UL NACK, may be transmitted in a fake uplink subframe. However, the Macro cell is configured as that: a UL ACK or UL NACK carried in a fake subframe 2 and a fake subframe 7 corresponds to a UL ACK or UL NACK of downlink data carried in DwPTS of subframe 6 and DwPTS of subframe 1. Therefore, as described above, because the subframe 1 and subframe 6 of the Macro have been configured as ABSs, no downlink service data needing UL ACK or UL NACK exists in the subframe 1 and subframe 6, so that the subframe 2 and subframe 7 which are configured as fake UL subframes do not carry any uplink information, thereby further reducing the interference to the downlink subframe of a Pico cell. In addition, latter parts of the subframe 2 and subframe 7 of the Macro correspond to the UpPTS parts of the subframe 1 and subframe 6 of the Pico, so the Macro may also configure transmission of some uplink signals in the latter parts of the subframe 2 and subframe 7, that is, the overlapping part with the UpPTS of the subframe 1 and subframe 6 of the Pico cell, where the configuration includes, but is not limited to, the sending configuration of PRACH and the sending configuration of SRS and the like.

502*a*: When the first indication information is the information indicating whether the user equipment needs to delay the receive/transmit transition time, and/or the information of specific delayed time for receive/transmit transition, the user equipment determines, according to the receive/transmit transition time needing to be delayed, a downlink time of performing neighboring cell measurement for the second base station.

The second base station refers to a neighboring base station corresponding to the serving base station of the user equipment, and it may be a neighboring base station interfered by the first base station, or may be a base station having a time offset in sending time with the first base station, where the time offset may be an integer number of OFDM (orthogonal frequency division multiplexing) symbols, an integer number of time slots, an integer number of subframes, or an integer number of radio frames, which is not limited herein.

The downlink time may be a time at which the second base station sends downlink data, or a time at which the user equipment receives downlink data. The downlink time may be represented by using an integer number of OFDM symbols, an integer number of time slots, an integer number of subframes, or an integer number of radio frames, which is not limited herein.

503a: The user equipment performs neighboring cell measurement for the second base station at the downlink time.

The neighboring cell measurement includes, but is not limited to, measurement related to channel quality indicator CQI, precoding matrix indicator PMI, rank indicator RI, RRM (radio resource management), and the like.

502b: When the first indication information is configuration information of an interference coordination mechanism adopted by the first base station and configuration information of the first base station, the user equipment determines, according to the first indication information, whether an uplink service exists at a first uplink time.

The first uplink time may be a time at which a serving base station (which is the first base station in the embodiment of the present application) of the user equipment receives uplink data, or a time at which the user equipment sends the uplink data. The uplink time may be represented by using an integer number of OFDM symbols, an integer number of time slots, an integer number of subframes, or an integer number of radio frames, which is not limited herein.

The uplink service may be an uplink data service, or may be an uplink control service, which specifically may be feedback reporting of a channel quality indicator CQI, a precoding matrix indicator PMI, a rank indicator RI and the like, sending of UL ACK (uplink acknowledgment)/UL NACK (uplink negative acknowledgment), sending of an SRS (sounding reference signal), sending of a PRACH (physical random access channel), sending of a PUSCH (physical uplink shared channel) and the like.

503b1: Determine that the receive/transmit transition time needing to be delayed is not zero, and acquire the delayed receive/transmit transition time.

That the receive/transmit transition time needing to be delayed is not zero may be that the receive/transmit transition time needing to be delayed is a positive integer number or negative integer number of OFDM symbols, a positive integer number or negative integer number of time slots, a positive integer number or negative integer number of subframes, or a positive integer number or negative integer number of radio frames, which is not limited herein. When the receive/transmit transition time needing to be delayed is a positive integer number of OFDM symbols or a positive integer number of time slots or a positive integer number of subframes or a positive integer number of radio frames, it indicates that the user equipment needs to add or reduce, based on an existing receive/transmit transition time, the receive/transmit transition time needing to be delayed. On the contrary, when the receive/transmit transition time needing to be delayed is a negative integer number of OFDM symbols or a negative integer number of time slots or a negative integer number of subframes or a negative integer number of radio frames, it indicates that the user equipment needs to reduce or add, based on an existing receive/transmit transition time, the receive/transmit transition time needing to be delayed. The existing receive/transmit transition time may be the receive/transmit transition time of the user equipment included in a GP (Guard Period guard period) between the DwPTS (Downlink Pilot Time Slot downlink pilot time slot) and UpPTS (Uplink Pilot Time Slot uplink pilot time slot) in the TDD system, or may be device state transition time needed when the user equipment is transited from a downlink data receiving state to an uplink data sending state, which is not limited herein.

504b1: The user equipment determines, according to the receive/transmit transition time needed to be delayed, a downlink time of performing neighboring cell measurement for the second base station, and performs neighboring cell measurement for the second base station at the downlink time. The neighboring cell measurement includes, but is not limited to, measurement related to channel quality indicator CQI, precoding matrix indicator PMI), rank indicator RI, RRM (radio resource management), and the like.

For example, firstly the second base station initiates a request to the first base station, so as to request the first base station to adopt an interference coordination mechanism, such as a fake UL subframe (fake uplink subframe) solution in combination with a time shift solution. The first base station determines whether to adopt the interference coordination mechanism, such as a fake UL subframe solution in combination with a time shift solution, by feeding back request response information.

Secondly, if the first base station determines to adopt the interference coordination mechanism, such as the fake UL subframe solution in combination with the time shift solution, the first base station may notify the user equipment through air interface that the fake UL subframe solution is adopted and notify the user equipment of specific configuration of a fake UL subframe. That is to say, before configuring the interference coordination mechanism, the first base station may interact with the second base station by using the foregoing method, so as to determine whether the first base station adopts the interference coordination mechanism, such as the fake UL subframe solution in combination with the time shift solution.

Finally, after learning the information, the user equipment may further learn, through the configuration information of the first base station, whether an uplink service of the user equipment exists in the fake UL subframe, where the uplink service includes, but is not limited to, feedback reporting of the channel quality indicator CQI, the precoding matrix indicator PMI, the rank indicator RI and the like, sending of the UL ACK (uplink acknowledgment)/the UL NACK (uplink negative acknowledgment), sending of the SRS (sounding reference signal), sending of the PRACH (physical random access channel), and the like. Whether the information exists in the fake UL subframe may be obtained through the existing configuration information of the first base station. Optionally, the first base station may also notify a location of a synchronization channel of an interfered cell to the user equipment, so that the user equipment may learn the location information of a CRS of a neighboring cell.

Hereto, the user equipment determines, through the foregoing information, whether the uplink service of the user equipment exists in the fake UL subframe, and determines the location information of the synchronization channel of the second base station through the location information of the synchronization channel of the second base station and the time offset between the second base station and the first base station, so as to adjust receive/transmit transition time according to the actual uplink service requirement of the user equipment and/or location information of the synchronization channel of the second base station, thereby determining the time of performing measurement for the second base station and completing neighboring cell measurement for the second base station. The notification of the foregoing information may be obtained through RRC broadcast signaling or RRC-specific signaling or physical layer signaling.

503*b*2: When the uplink service exists, determine that the receive/transmit transition time needing to be delayed is zero, that is, the receive/transmit transition time is not delayed.

The embodiment of the present application may further be applied in a scenario of time division duplex TDD flexible subframe proportion. For example, in the scenario of time division duplex TDD flexible subframe proportion, the 3GPP LTE Rel-11 (third generation partnership project long term evolution release-11) introduces a TDD flexible subframe application technology, that is to say, some flexible subframes are configured in a TDD system, each flexible subframe may be used as uplink or downlink, or may not be used temporarily. Last two subframes of each half-frame are flexible subframes. As shown in FIG. 5, D represents a downlink subframe, S represents a special subframe, U represents an uplink subframe and F represents a flexible subframe. In this case, if the UE obtains, through a signaling notification manner or by the UE itself, that a U subframe after an S subframe has no corresponding uplink data, the UE may not perform receive/transmit transition, that is, delay the receive/transmit transition time, so as to reduce the number of times of the receive/transmit transition of the UE, thereby reducing the complexity of the UE.

Figure 6:
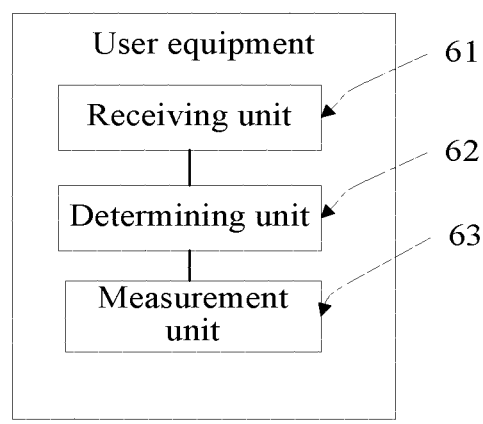
FIG. 6 is a schematic structural diagram of a user equipment according to Embodiment 2 of the present application.

An embodiment provides a user equipment, which can implement the method shown in FIG. 5. As shown in FIG. 6, the apparatus may include a receiving unit 61, a determining unit 62 and a measurement unit 63.

The receiving unit 61 is configured to receive first indication information sent by a first base station.

Optionally, the receiving unit 61 may specifically be configured to receive the first indication information which is sent by the first base station through first signaling.

The first base station may be a serving base station of the user equipment, or may be a communications entity in interface connection with the serving base station of the user equipment and having a function of sending information. The interface connection may be an X2 interface, an S1 interface, a fiber interface and a wireless interface, which is not limited herein. The communications entity may be a remote radio unit (RRU) in interface connection with the serving base station of the user equipment, or may be a mobile management entity (MME) in interface connection with the serving base station of the user equipment, or may be a non-serving base station in interface connection with the serving base station of the user equipment, which is not limited herein.

When the user equipment receives the first indication information which is sent by the first base station through the first signaling. When the first indication information includes information indicating whether the user equipment needs to delay receive/transmit transition time, and information of specific delayed time for receive/transmit transition, the first signaling, which is radio resource control RRC broadcast signaling, or RRC-specific signaling, or physical layer signaling, may be used to indicate the information indicating whether the user equipment needs to delay the receive/transmit transition time, and the information of specific delayed time for receive/transmit transition. Or, the first signaling, which is the radio resource control RRC broadcast signaling, or the RRC-specific signaling, or the physical layer signaling, may be used to indicate the information indicating whether the user equipment needs to delay the receive/transmit transition time, and first signaling which is different from the foregoing signaling is used to indicate the information of specific delayed time for receive/transmit transition of the user equipment. When the first indication information includes the information indicating whether the user equipment needs to delay the receive/transmit transition time, or the information of specific delayed time for receive/transmit transition, the first indication information may be directly sent to the user equipment by using the first signaling, which is the radio resource control RRC broadcast signaling, or the RRC-specific signaling, or the physical layer signaling.

In addition, when the first indication information includes configuration information of an interference coordination mechanism adopted by the first base station and configuration information of the first base station, the first signaling, which is the radio resource control RRC broadcast signaling, or the RRC-specific signaling, or the physical layer signaling, may be used to indicate the configuration information of the interference coordination mechanism adopted by the first base station and the configuration information of the first base station. Or, the first signaling, which is the radio resource control RRC broadcast signaling, or the RRC-specific signaling, or the physical layer signaling, may be used to indicate for the user equipment the configuration information of the interference coordination mechanism adopted by the first base station, and first signaling which is different from the foregoing signaling may be used to indicate the configuration information of the first base station.

The determining unit 62 is configured to determine, according to the first indication information received by the receiving unit 61, receive/transmit transition time needing to be delayed, and determine, according to the receive/transmit transition time needing to be delayed, a downlink time of performing neighboring cell measurement for a second base station.

The second base station refers to a neighboring base station corresponding to the serving base station of the user equipment, and it may be a neighboring base station interfered by the first base station, or may be a base station having a time offset in sending time with the first base station, where the time offset may be an integer number of OFDM (orthogonal frequency division multiplexing) symbols, an integer number of time slots, an integer number of subframes, or an integer number of radio frames, which is not limited herein.

The downlink time may be a time at which the second base station sends downlink data, or a time at which the receiving unit 61 receives downlink data. The downlink time may be represented by using an integer number of OFDM symbols, an integer number of time slots, an integer number of subframes, or an integer number of radio frames, which is not limited herein.

Optionally, the determining unit 62 is specifically configured to:

determine, according to the configuration information of the interference coordination mechanism adopted by the first base station and the configuration information of the first base station, whether an uplink service exists at a first uplink time.

The first uplink time may be a time at which a serving base station (which is the first base station in the embodiment of the present application) of the user equipment receives uplink data, or a time at which the user equipment sends the uplink data. The uplink time may be represented by using an integer number of OFDM symbols, an integer number of time slots, an integer number of subframes, or an integer number of radio frames, which is not limited herein.

The uplink service may be an uplink data service, or may be an uplink control service, which specifically may be feedback reporting of a channel quality indicator CQI, a precoding matrix indicator PMI, a rank indicator RI and the like, sending of UL ACK (uplink acknowledgment)/UL NACK (uplink negative acknowledgment), sending of an SRS (sounding reference signal), sending of a PRACH (physical random access channel), sending of a PUSCH (physical uplink shared channel) and the like.

When the uplink service does not exist, it is determined that the receive/transmit transition time needing to be delayed is not zero.

That the receive/transmit transition time needing to be delayed is not zero may be that the receive/transmit transition time needing to be delayed is a positive integer number or negative integer number of OFDM symbols, a positive integer number or negative integer number of time slots, a positive integer number or negative integer number of subframes, or a positive integer number or negative integer number of radio frames, which is not limited herein. When the receive/transmit transition time needing to be delayed is a positive integer number of OFDM symbols or a positive integer number of time slots or a positive integer number of subframes or a positive integer number of radio frames, it indicates that the user equipment needs to add or reduce, based on an existing receive/transmit transition time, the receive/transmit transition time needing to be delayed. On the contrary, when the receive/transmit transition time needing to be delayed is a negative integer number of OFDM symbols or a negative integer number of time slots or a negative integer number of subframes or a negative integer number of radio frames, it indicates that the user equipment needs to reduce or add, based on an existing receive/transmit transition time, the receive/transmit transition time needing to be delayed. The existing receive/transmit transition time may be the receive/transmit transition time of the user equipment included in a GP (Guard Period guard period) between the DwPTS (Downlink Pilot Time Slot downlink pilot time slot) and UpPTS (Uplink Pilot Time Slot uplink pilot time slot) in the TDD system, or may be device state transition time needed when the user equipment is transited from a downlink data receiving state to an uplink data sending state, which is not limited herein.

When the uplink service exists, it is determined that the receive/transmit transition time needing to be delayed is zero.

The measurement unit 63 is configured to perform neighboring cell measurement for the second base station at the downlink time determined by the determining unit 62.

The neighboring cell measurement includes, but is not limited to, measurement related to channel quality indicator CQI, precoding matrix indicator PMI, rank indicator RI, RRM (radio resource management), and the like.

The apparatus according to the embodiment of the present application may further be applied in a scenario of time division duplex TDD flexible subframe proportion, which is similar to the situation of the method shown in FIG. 5, and is not described herein again.

Figure 7:
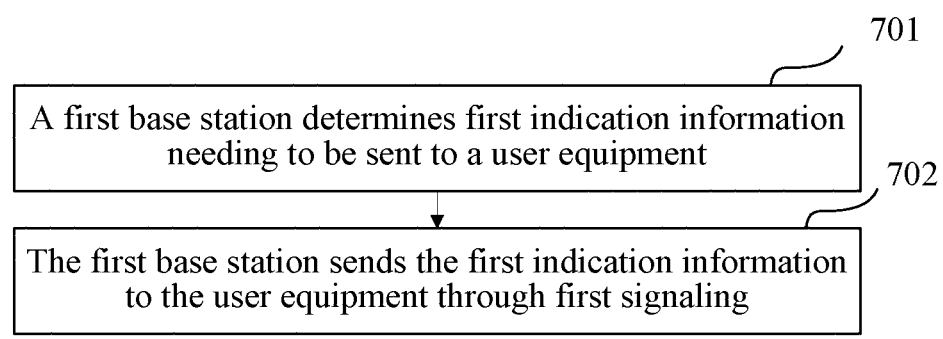
FIG. 7 is a flow chart of a method for processing receive/transmit transition time of a user equipment according to Embodiment 2 of the present application.

An embodiment provides a method for processing receive/transmit transition time of a user equipment. As shown in FIG. 7, the method includes:

701: A first base station determines first indication information needing to be sent to a user equipment.

The first base station may determine, according to a time offset between the first base station and a second base station, whether to send the first indication information to the user equipment, the first base station may also determine, according to whether an interference mechanism is adopted to reduce the interference to the second base station, whether to send the first indication information to the user equipment, and the first base station may also determine, according to other manners, whether to send the first indication information to the user equipment, which is not limited herein. The interference mechanism may be that the first base station adopts fake uplink subframe (fake UL subframe) configuration, or that the first base station adopts low-power sending subframe configuration or almost blank sending subframe configuration, or that the first base station jointly adopts the fake UL subframe configuration and a time shift technology, or that the first base station jointly adopts the low-power sending subframe configuration and the time shift technology, or the almost blank sending subframe configuration and the time shift technology, which is not limited herein.

702: The first base station sends the first indication information to the user equipment through first signaling.

Further, the user equipment determines, according to the first indication information, receive/transmit transition time needing to be delayed, further determines, according to the receive/transmit transition time needing to be delayed, a downlink time of performing neighboring cell measurement for a second base station, and performs neighboring cell measurement for the second base station at the downlink time.

When the first indication information includes information indicating whether the user equipment needs to delay the receive/transmit transition time, and information of specific delayed time for receive/transmit transition, the first signaling, which is radio resource control RRC broadcast signaling, or RRC-specific signaling, or physical layer signaling, may be used to indicate the information indicating whether the user equipment needs to delay the receive/transmit transition time, and the information of specific delayed time for receive/transmit transition. Or, the first signaling, which is the radio resource control RRC broadcast signaling, or the RRC-specific signaling, or the physical layer signaling, may be used to indicate the information indicating whether the user equipment needs to delay the receive/transmit transition time, and first signaling which is different from the foregoing signaling is used to indicate the information of specific delayed time for receive/transmit transition. When the first indication information includes the information indicating whether the user equipment needs to delay the receive/transmit transition time, or the information of specific delayed time for receive/transmit transition, the first indication information may be directly sent to the user equipment by using the first signaling, which is the radio resource control RRC broadcast signaling, or the RRC-specific signaling, or the physical layer signaling.

For example, the first base station may instruct, by using RRC broadcast signaling, a user equipment served by a current cell to delay the receive/transmit transition time, where the content carried in the signaling includes, but is not limited to, content indicating whether the user equipment UE needs to delay the receive/transmit transition time and content indicating receive/transmit transition time specifically needing to be delayed by the UE. The signaling may be carried in existing RRC broadcast signaling, for example, may be carried in a physical broadcast channel PBCH, and use redundancy bit information in the PBCH to indicate whether the UE served by the current cell needs to delay the receive/transmit transition time. Further, information of 1 bit may be used to directly indicate whether the UE needs to delay the receive/transmit transition time. In this case, the delayed time required by the UE may be defaulted between the first base station and the UE, for example, time of 1 subframe may be delayed based on the existing delayed time for receive/transmit transition of the UE; or redundancy bit information may be used to directly indicate the delayed time required by the UE for receive/transmit transition, for example, the number of redundancy bits on the PBCH is X, $2^X$ states may be represented. The delayed time for receive/transmit transition may be counted with an orthogonal frequency division multiplexing (OFDM) symbol/subframe/frame as a unit. For example, in the previous example, if the UE is instructed to delay time of 1 subframe, specifically the signaling may be represented as 1sf (1 subframe) or 0.1rf (0.1 radio frame) or 14symbol (14 symbols) or 10slot (10 time slots) by using one of the $2^X$ states, or may be represented by using another manner, which is not limited herein. On the other hand, the signaling may also be carried in a system information block SIB (System information block), which specifically may be SIB-1/SIB-2/SIB-3 or the like. The carried information may be what described above, or may be a field directly extended in SIB information. The extended field is used to instruct UE to delay the receive/transmit transition time, and the delayed receive/transmit transition time may ensure that the UE is capable of correctly interpreting information carried in an SCH (synchronization channel) of a neighboring cell, so as to obtain a location of a CRS (cell-specific reference signal), thereby performing neighboring cell measurement.

On the other hand, the first base station may also instruct, by using RRC-specific signaling, a user equipment served by the current cell to delay the receive/transmit transition time. Content carried in the RRC-specific signaling includes, but is not limited to, content indicating whether the UE needs to delay the transition time, and content indicating the specific receive/transmit transition time needing to be delayed by the UE. The RRC-specific signaling may be valid for a group of users having the same feature. For example, the RRC-specific signaling may be valid for a user needing to perform neighboring cell measurement. That is to say, when reading the RRC-specific signaling, the user needing to perform neighboring cell measurement may delay, according to the content of the signaling, the receive/transmit transition time notified by the signaling, so as to ensure that neighboring cell measurement can be performed normally.

On the other hand, the first base station may also instruct, by using physical layer signaling, a user equipment served by the current cell to delay the receive/transmit transition time. Likewise, the content carried in the signaling includes, but is not limited to, content indicating whether the UE needs to delay the receive/transmit transition time, and content indicating the receive/transmit transition time specifically needing to be delayed by the UE. For example, a redundancy bit carried in a physical downlink control channel PDCCH may be used to indicate the foregoing content. Information of the redundancy bit may be obtained by a PDCCH which carries paging channel (Paging) scheduling information or carries system information block type 1 (SIB1) scheduling information or carries physical random access channel (PRACH) scheduling information. Further, for a TDD (Time Division Duplex) system, a paging channel is always in No. 0 subframe; therefore, the UE can always detects, in the No. 0 subframe, a reserved field (that is, the redundancy bit) on the PDCCH scheduling the paging channel, so as to acquire whether the receive/transmit transition time needs to be delayed in a subsequent period of time after the No. 0 subframe, and acquire the specific delayed time if it needs to be delayed. On the other hand, because information of SIB1 is transmitted every 20 ms, that is, the information of SIB1 is transmitted in subframe 5 of each even-numbered radio frame, the UE may learn, by detecting a reserved field (that is, the redundancy bit) on the PDCCH carrying SIB1 scheduling information, whether the receive/transmit transition time needs to be delayed in a subsequent period of time after the subframe 5, and acquire the specific delayed time if it needs to be delayed. For the PRACH, a similar process exists.

In addition, no matter whether the base station uses the RRC broadcast signaling or the RRC-specific signaling or the physical layer signaling to notify the UE of content indicating that the user equipment UE delays the receive/transmit transition time, once the UE delays the receive/transmit transition time, the base station may instruct, by using other signaling, the UE to stop delaying the receive/transmit transition time, and the signaling may be carried in the foregoing signaling, that is, included in the content "indicating whether the UE needs to delay the receive/transmit transition time", and the base station may perform indication by using new RRC broadcast signaling or RRC-specific signaling or physical layer signaling.

In addition, specifically, the user equipment receives the first indication information which is sent by the first base station through first signaling. When the first indication information includes configuration information of an interference coordination mechanism adopted by the first base station and configuration information of the first base station, the first signaling, which is the radio resource control RRC broadcast signaling, or the RRC-specific signaling, or the physical layer signaling, may be used to indicate the configuration information of the interference coordination mechanism adopted by the first base station and the configuration information of the first base station. Or, the first signaling, which is the radio resource control RRC broadcast signaling, or the RRC-specific signaling, or the physical layer signaling, may be used to indicate for the user equipment the configuration information of the interference coordination mechanism adopted by the first base station, and first signaling which is different from the foregoing signaling may be used to indicate the configuration information of the first base station. Further, a specific designing manner of the signaling may be the same as what described above, which is not described herein again.

Further, the first base station (macro base station Macro) adopts a proportion 0, the second base station (pico base station Pico) adopts a proportion 1, and the first base station and the second base station avoid, by using a fake UL subframe solution and subframe shift, interference from the first base station to a common channel of the second base station such as a synchronization channel SCH/a physical broadcast channel PBCH, and interference from the first base station to a physical downlink control channel PDCCH and/or a physical downlink shared channel PDSCH tranmistted in a subframe 1 and a subframe 6 of the second base station. Further, in order to avoid the interference from the first base station to the Paging channel and SIB-1 channel for transmission of the second base station, the first base station may further configure a downlink part of the subframe 1 and the subframe 6 (such as a downlink pilot time slot DwPTS or a downlink subframe, in this example, because the Macro adopts the TDD proportion 0, the downlink part of the subframes 1 and 6 is the DwPTS) as an almost blank subframe (ABS), so as to further reduce the interference to the Paging channel and SIB-1 channel of an interfered cell. The almost blank subframe refers to that only transmission of common pilot is present in this subframe, or that only transmission of common pilot and transmission of limited control channel (such as physical downlink control channel PDCCH: physical downlink control channel) are present in this subframe. The limited control channel in the almost blank subframe may be used to schedule the paging information and/or system information, or may be used to schedule other broadcast information or unicast information. As described above, in consideration of ensuring backward compatibility of the user equipment UE served by the first base station, limited uplink signals, such as UL ACK or UL NACK, may be transmitted in a fake uplink subframe. However, the Macro cell is configured as that: a UL ACK or UL NACK carried in a fake subframe 2 and a fake subframe 7 corresponds to a UL ACK or UL NACK of downlink data carried in DwPTS of subframe 6 and DwPTS of subframe 1. Therefore, as described above, because the subframe 1 and subframe 6 of the Macro have been configured as ABSs, no downlink service data needing UL ACK or UL NACK exists in the subframe 1 and subframe 6, so that the subframe 2 and subframe 7 which are configured as fake UL subframes do not carry any uplink information, thereby further reducing the interference to the downlink subframe of a Pico cell. In addition, latter parts of the subframe 2 and subframe 7 of the Macro correspond to the UpPTS parts of the subframe 1 and subframe 6 of the Pico, so the Macro may also configure transmission of some uplink signals in the latter parts of the subframe 2 and subframe 7, that is, the overlapping part with the UpPTS of the subframe 1 and subframe 6 of the Pico cell, where the configuration includes, but is not limited to, the sending configuration of PRACH and the sending configuration of SRS and the like.

The method according to the embodiment of the present application may further be applied in a scenario of time division duplex TDD flexible subframe proportion. For example, in the scenario of time division duplex TDD flexible subframe proportion, the 3GPP LTE Rel-11 (third generation partnership project long term evolution release-11) introduces a TDD flexible subframe application technology, that is to say, some flexible subframes are configured in a TDD system, each flexible subframe may be used as uplink or downlink, or may not be used temporarily. Last two subframes of each half-frame are flexible subframes. As shown in FIG. 5, D represents a downlink subframe, S represents a special subframe, U represents an uplink subframe and F represents a flexible subframe. In this case, if the UE obtains, through a signaling notification manner or by the UE itself, that a U subframe after an S subframe has no corresponding uplink data, the UE may not perform receive/transmit transition, that is, delay the receive/transmit transition time, so as to reduce the number of times of the receive/transmit transition of the UE, thereby reducing the complexity of the UE.

Figure 8:
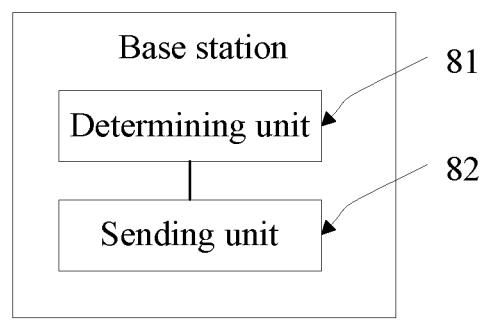
FIG. 8 is a schematic structural diagram of a base station according to Embodiment 2 of the present application.
Figure 9:
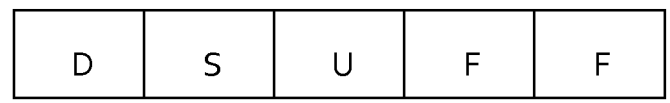
FIG. 9 is a schematic diagram of an application of a flexible subframe in a radio frame.

An embodiment provides an apparatus for processing receive/transmit transition time of a user equipment. As shown in FIG. 8, the apparatus includes a determining unit 81 and a sending unit 82.

The determining unit 81 is configured to determine first indication information needing to be sent to a user equipment.

The determining unit 81 may determine, according to a time offset between a first base station and a second base station, whether to send the first indication information to the user equipment, the determining unit 81 may also determine, according to whether an interference mechanism is adopted to reduce the interference to a second base station, whether to send the first indication information to the user equipment, and the determining unit 81 may also determine, according to other manners, whether to send the first indication information to the user equipment, which is not limited herein. The interference mechanism may be that the first base station adopts fake uplink subframe (fake UL subframe) configuration, or that the first base station adopts low-power sending subframe configuration or almost blank sending subframe configuration, or that the first base station jointly adopts the fake UL subframe configuration and a time shift technology, or that the first base station jointly adopts the low-power sending subframe configuration and the time shift technology, or the almost blank sending subframe configuration and the time shift technology, which is not limited herein.

The sending unit 82 is configured to send the first indication information determined by the determining unit 81 to the user equipment, so that the user equipment determines, according to the first indication information, receive/transmit transition time needing to be delayed, further determines, according to the receive/transmit transition time needing to be delayed, a downlink time of performing neighboring cell measurement for a second base station, and performs neighboring cell measurement for the second base station at the downlink time.

Optionally, the determining unit 82 may specifically be configured to:

send the first indication information to the user equipment through first signaling.

When the first indication information includes information indicating whether the user equipment needs to delay the receive/transmit transition time, and information of specific delayed time for receive/transmit transition, the first signaling, which is radio resource control RRC broadcast signaling, or RRC-specific signaling, or physical layer signaling, may be used to indicate the information indicating whether the user equipment needs to delay the receive/transmit transition time, and the information of specific delayed time for receive/transmit transition. Or, the first signaling, which is the radio resource control RRC broadcast signaling, or the RRC-specific signaling, or the physical layer signaling, may be used to indicate the information indicating whether the user equipment needs to delay the receive/transmit transition time, and first signaling which is different from the foregoing signaling is used to indicate the information of specific delayed time for receive/transmit transition of the user equipment. When the first indication information includes the information indicating whether the user equipment needs to delay the receive/transmit transition time, or the information of specific delayed time for receive/transmit transition, the first indication information may be directly sent to the user equipment by using the first signaling, which is the radio resource control RRC broadcast signaling, or the RRC-specific signaling, or the physical layer signaling.

In addition, when the first indication information includes configuration information of an interference coordination mechanism adopted by the first base station and configuration information of the first base station, the first signaling, which is the radio resource control RRC broadcast signaling, or the RRC-specific signaling, or the physical layer signaling, may be used to indicate the configuration information of the interference coordination mechanism adopted by the first base station and the configuration information of the first base station. Or, the first signaling, which is the radio resource control RRC broadcast signaling, or the RRC-specific signaling, or the physical layer signaling, may be used to indicate the configuration information of the interference coordination mechanism adopted by the first base station, and first signaling which is different from the foregoing signaling may be used to indicate the configuration information of the first base station.

The apparatus according to the embodiment of the present application may further be applied in a scenario of time division duplex TDD flexible subframe proportion, which is similar to the situation of the method shown in FIG. 7, and is not described herein again.

In the method and apparatus for processing receive/transmit transition time of a user equipment according to the embodiments of the present application, firstly, the first base station sends the first indication information to the user equipment, then the user equipment determines, according to the first indication information, the receive/transmit transition time needing to be delayed, and finally, the user equipment determines, according to the receive/transmit transition time needing to be delayed, the downlink time of performing neighboring cell measurement for the second base station, and the user equipment performs neighboring cell measurement for the second base station at the downlink time. In the prior art, although the problem of co-channel interference between base stations may be eliminated, the user equipment served by the first base station cannot perform neighboring cell measurement for the second base station. However, in the embodiments of the present application, when the problem of co-channel interference between base stations is eliminated, normal neighboring cell measurement can still be performed for the second base station by delaying the receive/transmit transition time of the user equipment. In this case, neighboring cell measurement can be performed when the channel quality is ensured.

The apparatus for processing receive/transmit transition time of a user equipment according to the embodiment of the present application may implement the foregoing method. For implementation of the specific functions, reference may be made to the description in the method embodiment, and details are not described herein again. The method and apparatus for processing receive/transmit transition time of a user equipment according to the embodiments of the present application may be applied to the field of wireless communications systems, but are not limited thereto.

Persons of ordinary skill in the art should understand that, all or a part of process in the method according to the embodiments may be accomplished by a computer program instructing relevant hardware. The program may be stored in a computer-readable storage medium. When the program is executed, the process of the method according to the embodiments of the present application is performed. The storage medium may be a magnetic disk, an optical disk, a read-only memory (ROM), or a random access memory (RAM).

The foregoing description is merely about the specific embodiments of the present application, but is not intended to limit the protection scope of the present application. Changes or replacements readily figured out by persons skilled in the prior art within the technical scope of the present application should fall within the protection scope of the present application. Therefore, the protection scope of the present application is subject to the protection scope of the claims.

What is claimed is:

1. A method for processing receive/transmit transition time of a user equipment, comprising:
    receiving, by a user equipment, first indication information sent by a first base station;
    determining, by the user equipment according to the first indication information, receive/transmit transition time needing to be delayed;
    determining, by the user equipment according to the receive/transmit transition time needing to be delayed, a downlink time of performing neighboring cell measurement for a second base station; and
    performing, by the user equipment, neighboring cell measurement for the second base station at the downlink time,
    wherein the first indication information comprises configuration information of an interference coordination mechanism adopted by the first base station and configuration information of the first base station, and
    wherein the determining, by the user equipment according to the first indication information, the receive/transmit transition time needing to be delayed comprises:
    determining, according to the configuration information of the interference coordination mechanism adopted by the first base station and the configuration information of the first base station, whether an uplink service exists at a first uplink time;
    when the uplink service does not exist, determining that the receive/transmit transition time needing to be delayed is not zero; and
    when the uplink service exists, determining that the receive/transmit transition time needing to be delayed is zero.

2. The method according to claim 1, wherein the receiving, by the user equipment, the first indication information sent by the first base station comprises:
    receiving, by the user equipment, the first indication information which is sent by the first base station through first signaling, wherein the first signaling comprises:
    radio resource control RRC broadcast signaling, or RRC-specific signaling, or physical layer signaling.

3. The method according to claim 1, wherein
    the first indication information comprises: information indicating whether the user equipment needs to delay the receive/transmit transition time, and/or information of specific delayed time for receive/transmit transition.

4. A method for processing receive/transmit transition time of a user equipment, comprising:
    determining, by a first base station, first indication information needing to be sent to a user equipment; and
    sending, by the first base station, the first indication information to the user equipment, so that the user equipment determines, according to the first indication information, receive/transmit transition time needing to be delayed, further determines, according to the receive/transmit transition time needing to be delayed, a downlink time of performing neighboring cell measurement for a second base station, and performs neighboring cell measurement for the second base station at the downlink time,
    wherein the first indication information comprises configuration information of an interference coordination mechanism adopted by the first base station and configuration information of the first base station, and
    wherein the determining, by the user equipment according to the first indication information, the receive/transmit transition time needing to be delayed comprises:
    determining, according to the configuration information of the interference coordination mechanism adopted by the first base station and the configuration information of the first base station, whether an uplink service exists at a first uplink time;

when the uplink service does not exist, determining that the receive/transmit transition time needing to be delayed is not zero; and when the uplink service exists, determining that the receive/transmit transition time needing to be delayed is zero.

5. The method according to claim 4, wherein the sending, by the first base station, the first indication information to the user equipment comprises: sending, by the first base station, the first indication information to the user equipment through first signaling, and the first signaling comprises:

radio resource control RRC broadcast signaling, or RRC-specific signaling, or physical layer signaling.

6. The method according to claim 4, wherein the first indication information comprises: information indicating whether the user equipment needs to delay the receive/transmit transition time, and/or information of specific delayed time for receive/transmit transition.

7. A user equipment, comprising:
at least one memory comprising instructions and at least one hardware processor to execute the instructions within the at least one memory to implement:
receiving first indication information sent by a first base station;
determining, according to the first indication information, receive/transmit transition time needing to be delayed, and determining, according to the receive/transmit transition time needing to be delayed, a downlink time of performing neighboring cell measurement for a second base station; and
performing neighboring cell measurement for the second base station at the downlink time,
wherein the first indication information comprises configuration information of an interference coordination mechanism adopted by the first base station and configuration information of the first base station, and
wherein the at least one hardware processor executes the instructions within the at least one memory to implement:
determining, according to the configuration information of the interference coordination mechanism adopted by the first base station and the configuration information of the first base station, whether an uplink service exists at a first uplink time;
when the uplink service does not exist, determining that the receive/transmit transition time needing to be delayed is not zero; and
when the uplink service exists, determining that the receive/transmit transition time needing to be delayed is zero.

8. The user equipment according to claim 7, wherein the receiving the first indication information sent by the first base station is performed through first signaling, and the first signaling comprises:

radio resource control RRC broadcast signaling, or RRC-specific signaling, or physical layer signaling.

9. The user equipment according to claim 7, wherein the first indication information comprises:
information indicating whether the user equipment needs to delay the receive/transmit transition time, and/or information of specific delayed time for receive/transmit transition.

10. A base station, comprising:
at least one memory comprising instructions and at least one hardware processor to execute the instructions within the at least one memory to implement:
determining first indication information needing to be sent to a user equipment; and
sending the first indication information to the user equipment, so that the user equipment determines, according to the first indication information, receive/transmit transition time needing to be delayed, further determines, according to the receive/transmit transition time needing to be delayed, a downlink time of performing neighboring cell measurement for a second base station, and performs neighboring cell measurement for the second base station at the downlink time,
wherein the first indication information comprises configuration information of an interference coordination mechanism adopted by the first base station and configuration information of the first base station, and
wherein the determining, by the user equipment according to the first indication information, the receive/transmit transition time needing to be delayed comprises:
determining, according to the configuration information of the interference coordination mechanism adopted by the first base station and the configuration information of the first base station, whether an uplink service exists at a first uplink time;
when the uplink service does not exist, determining that the receive/transmit transition time needing to be delayed is not zero; and
when the uplink service exists, determining that the receive/transmit transition time needing to be delayed is zero.

11. The base station according to claim 10, wherein the sending the first indication information to the user equipment is performed through first signaling, and the first signaling comprises:

radio resource control RRC broadcast signaling, or RRC-specific signaling, or physical layer signaling.

12. The base station according to claim 10, wherein the first indication information comprises: information indicating whether the user equipment needs to delay the receive/transmit transition time, and/or information of specific delayed time for receive/transmit transition.

* * * * *